Figures 1, 2:
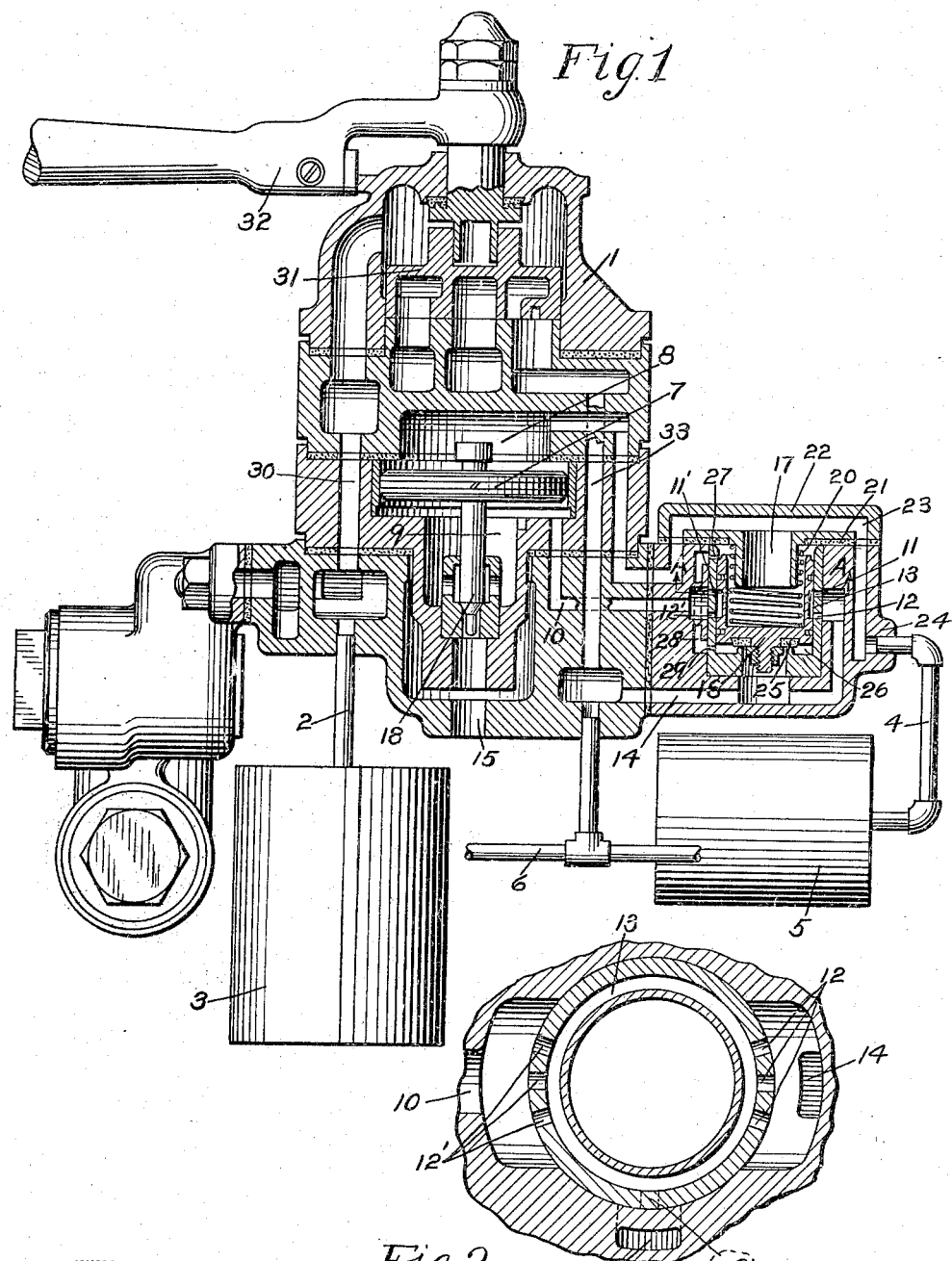

W. V. TURNER.
ENGINEER'S BRAKE VALVE DEVICE.
APPLICATION FILED JULY 13, 1915.

1,228,499.

Patented June 5, 1917.

WITNESSES
H. W. Crowell.

INVENTOR
Walter V. Turner
by Wm. N. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ENGINEER'S BRAKE-VALVE DEVICE.

1,228,499.  Specification of Letters Patent.  Patented June 5, 1917.

Application filed July 13, 1915. Serial No. 39,566.

*To all whom it may concern:*

Be it known that I, WALTER V. TURNER, a citizen of the United States, residing at Edgewood, in the county of Allegheny and State of Pennsylvania, have invented new and useful Improvements in Engineers' Brake-Valve Devices, of which the following is a specification.

This invention relates to fluid pressure brakes, and more particularly to an automatic brake in which the brakes are applied by reducing the brake pipe pressure.

In a prior pending application of P. H. Donovan, Serial No. 873,873, filed November 25, 1914, a brake valve device is shown and described in which means are provided for securing a more nearly uniform rate of reduction in pressure throughout the brake pipe on a long train, so as to secure a more uniform application of the brakes and thus avoid shocks.

The means above referred to consist in so constructing the equalizing discharge valve that when the equalizing reservoir pressure reduces at a greater rate than the brake pipe pressure, as would be the case on a long train, the equalizing discharge valve is operated to restrict the flow of fluid from the brake pipe to the atmosphere.

With this construction, if leakage should occur around the equalizing discharge piston, the discharge valve might not be moved sufficiently to restrict the flow from the brake pipe when desired.

The principal object of my invention is to provide means for regulating the flow from the brake pipe to the atmosphere which will not be affected by possible leakage around the equalizing discharge piston but will be operated positively whenever the equalizing reservoir pressure reduces at a greater rate than the brake pipe pressure reduces.

In the accompanying drawing; Figure 1 is a central sectional view of a brake valve device embodying my invention, with the parts shown in normal release position; and Fig. 2 is an enlarged longitudinal section on the line A—A of Fig. 1.

As shown in Fig. 1, the brake valve device may comprise a sectional casing 1 having the usual rotary valve chamber connected by passage 30 and pipe 2 with the main reservoir 3 and containing rotary valve 31, operated by the handle 32, the brake pipe 6 communicating with a passage 33 leading to the rotary valve seat.

The brake valve casing also contains the usual equalizing piston 7, subject on one side to the pressure in chamber 8 which is open to the equalizing reservoir 5 through passage 23 and pipe 4, and on the opposite side to the pressure in a chamber 9, which is open to the brake pipe 6, means being provided, however, according to the present invention, for varying the rate of flow from the brake pipe to the chamber 9.

The equalizing piston 7 operates the usual discharge valve 18 for controlling the venting of the air from the chamber 9 and the brake pipe to the atmosphere.

According to my invention, there is provided a piston valve 16 adapted to control communication between the brake pipe 6 and chamber 9. Said piston is contained in a casing 24, which may be secured to the brake valve casing as shown in the drawing, and is adapted to seal against a seat 21 in one position and against another seat 25 in its opposite position.

The piston valve 16 is subject on one side to the pressure of a coil spring 20 and a chamber 17 which is constantly open through passage 23 to the equalizing reservoir 5, and on the opposite side to brake pipe pressure which normally acts on a restricted area of the piston when on its seat 25, the full area of the piston being exposed to brake pipe pressure when the piston lifts from its seat.

In operation, the equalizing reservoir is charged with the brake pipe in the usual manner, and the piston valve 16 will be held on its brake pipe seat 25 by the tension of the spring 20, since the brake pipe and equalizing reservoir pressures are balanced. The annular space 26 at the lower end of the valve is preferably connected to chamber 17 through passages 27, 28, and 29, so as to insure that when the piston valve 16 is on its brake pipe seat 25, the pressure in chamber 26 will always be equal to that in chamber 17.

When the brake valve handle is moved to service position, the preliminary exhaust port is opened and the pressure in chamber 8 and the equalizing reservoir is reduced in the usual manner.

The brake pipe pressure then lifts piston 7 and unseats the discharge valve 18 so that fluid is vented from the brake pipe 6 through passage 14, ports 11 and 12 in the piston bush, annular space 13, ports 11' and 12' in said bush and through passage 10 to the chamber 9 and thence past the discharge valve 18 to the exhaust port 15.

If the train is short and the brake pipe volume such that the pressure therein can reduce as fast as the pressure in the equalizing reservoir is reducing through the preliminary exhaust port, then the piston valve 16 will remain seated on the brake pipe seat 25 as shown in Fig. 1 of the drawing, and the discharge valve 18 operates to control the venting of fluid from the brake pipe in the usual manner.

If, however, the train is long, the pressure in the equalizing reservoir will reduce at a faster rate than the brake pipe pressure, and when a sufficient differential has been established on the piston valve 16, governed by the tension of the spring 20 and the area exposed to brake pipe pressure, this valve will be shifted to its uppermost position against the seat 21. This movement will be quick and positive, since as soon as the valve starts away from its brake pipe seat 25 the whole area will be exposed to the higher brake pipe pressure.

In this position of the piston valve 16, ports 12 and 12' are closed and the only opening between passages 14 and 10 and consequently between the brake pipe 6 and the exhaust port 15, is by way of the upper series of ports 11 and 11'. It will thus be seen that with the piston valve 16 in this position, the rate of reduction in brake pipe pressure will be made slower than at the beginning of the application.

When the brake valve handle is turned to lap position, after making the desired reduction in equalizing reservoir pressure, fluid from the brake pipe will continue to exhaust to the atmosphere through the restricted ports 11 and 11', until the brake pipe pressure has been reduced to a point at which the equalizing reservoir pressure combined with the tension of the spring 20 slightly exceed the brake pipe pressure, when the piston valve 16 will be moved downward to its brake pipe seat 25 again, opening ports 12 and 12' so that the final exhaust of fluid from the brake pipe will be at the initial or usual rate.

It will now be apparent that with the above described construction, if the rate of reduction in equalizing reservoir pressure exceeds the rate at which the brake pipe pressure reduces, the valve piston will be positively operated to restrict the flow from the brake pipe.

Having now described my invention, what I claim as new and desire to secure by Letters Patent, is:

1. In a fluid pressure brake, the combination with a brake pipe and a brake valve device having an equalizing discharge valve mechanism for venting fluid from the brake pipe upon a reduction in equalizing reservoir pressure, of a valve device subject to the opposing pressures of the brake pipe and the equalizing reservoir for restricting the discharge of fluid from the brake pipe when the rate of reduction in equalizing reservoir pressure exceeds the rate of reduction in brake pipe pressure.

2. In a fluid pressure brake, the combination with a brake pipe and a brake valve device having an equalizing discharge valve mechanism for venting fluid from the brake pipe upon a reduction in equalizing reservoir pressure, of a valve piston subject to the opposing pressures of the equalizing reservoir and the brake pipe and operative to restrict communication through which fluid is vented from the brake pipe by the discharge valve mechanism when the equalizing reservoir pressure is reduced at a greater rate than the brake pipe pressure.

3. In a fluid pressure brake, the combination with a brake pipe and a brake valve device having an equalizing discharge valve mechanism for venting fluid from the brake pipe upon a reduction in equalizing reservoir pressure, of a valve piston subject on one side to the pressure of the equalizing reservoir and a spring and on the opposite side over a restricted area to brake pipe pressure and operated, when the equalizing reservoir pressure is less than the brake pipe pressure, to expose the full area to brake pipe pressure and then restrict communcation for discharging fluid from the brake pipe through the equalizing discharge valve.

4. The combination with a brake pipe and a brake valve device having an equalizing discharge valve mechanism operated upon a reduction in equalizing reservoir pressure for discharging fluid from the brake pipe, of a valve device separate from the equalizing discharge valve mechanism for restricting the discharge of fluid from the brake pipe when the equalizing reservoir pressure is reduced faster than the brake pipe pressure.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."